United States Patent [19]
Nesbitt et al.

[11] Patent Number: 5,799,872
[45] Date of Patent: Sep. 1, 1998

[54] PURGING OF FLUID SPRAY APPARATUS

[75] Inventors: Gregory S. Nesbitt, Norwalk; Robert D. Shoemaker, West Des Moines, both of Iowa

[73] Assignee: Delavan Inc, West Des Moines, Iowa

[21] Appl. No.: 866,467

[22] Filed: May 30, 1997

Related U.S. Application Data

[63] Continuation of Ser. No. 378,025, Jan. 24, 1995, Pat. No. 5,701,732.

[51] Int. Cl.⁶ ........................................ B05B 15/02
[52] U.S. Cl. .................. 239/8; 239/113; 239/406; 239/424.5
[58] Field of Search .................... 60/39.094, 737, 60/742, 748; 239/8, 406, 424.5, 113

[56] References Cited

U.S. PATENT DOCUMENTS

| | | |
|---|---|---|
| 3,375,978 | 4/1968 | Rennie ........................... 239/113 |
| 4,216,652 | 8/1980 | Herman et al. ................. 60/748 |
| 4,856,713 | 8/1989 | Burnett .......................... 239/113 |
| 5,243,816 | 9/1993 | Huddas . |
| 5,277,023 | 1/1994 | Bradley et al. . |
| 5,417,054 | 5/1995 | Lee et al. ....................... 60/742 |

Primary Examiner—Michael Koczo
Attorney, Agent, or Firm—Cummings & Lockwood

[57] ABSTRACT

The purging of residual fuel in gas turbine combustor fuel injectors is disclosed in which the fuel injector includes a fuel element having a first and second fuel passage for discharging the fuel to the combustor of the gas turbine. Upon interruption of the fuel to the fuel element, high pressure air is passed through an air passage to the first fuel passage to force the fuel in the reverse direction through the first fuel passage, through the second fuel passage, and discharge the residual fuel in each of the passages to the combustor through the second fuel passage.

37 Claims, 4 Drawing Sheets

PURGING OF FLUID SPRAY APPARATUS

This application is a continuation, of application(s) Ser. No. 378,025, filed Jan. 24, 1995, U.S. Pat. No. 5,701,732.

BACKGROUND AND SUMMARY OF THE INVENTION

The present invention is directed to the purging of fluid injectors, such as gas turbine fuel injectors for the combustor of a gas turbine and, more particularly, to such fuel injectors, systems and methods in which residual fuel in the injector is purged when the supply of fuel is interrupted.

In gas turbine operation fuel and air are injected into a combustor by injectors. In order to reduce the emission levels in modern gas turbines, two sets of such injectors are typically employed. One set, the pilot injectors, supply fuel and air at all times to the combustor of the gas turbine during operation no matter whether the turbine is operating at low power levels, such as during idle or during a descent from higher altitudes in an aircraft turbine, or during high power levels, such as during takeoff of a turbine powered aircraft. The second set of injectors, the main or supplemental injectors, only operate during high power level operation, such as during takeoff or climbing to higher altitudes. When the high power levels are no longer necessary, the main or supplemental injectors are shut down.

When the main or supplemental injectors are shut down, a potential problem arises with respect to the fuel remaining in the main or supplemental injectors due to the fact that these injectors are exposed both to the high heat of combustion in the combustor of the still operating turbine as well as the high temperatures of the compressor discharge air in the air plenum. Such high heat may result in coking of this remaining fuel which results in the potential plugging of these injectors. Accordingly, various attempts have been made in the past to purge the residual fuel from the main or supplemental injectors during shut down in order to prevent these coking problems.

In one prior art fuel injector purging system a support stem is mounted at one end to a high pressure air plenum wall and a fuel/air injector is mounted at the other end of the support stem and in the combustor wall so as to discharge the fuel and air into the combustor chamber. The support stem has a pair of passages. One passage is an air purging passage one end of which communicates with an air channel in the injector, and the other end of which communicates with a movable ball check valve. The other passage is the fuel passage which communicates the fuel to the injector for discharge into the combustor. When high pressure fuel is supplied to the check valve, the valve blocks the air purge passage. When the supply of high pressure fuel is interrupted, the higher pressure air in the air channel of the injector passes through the air purge passage, unseats the check valve ball and moves it so as to block further entry of residual fuel from the fuel supply. The higher pressure air then passes through the fuel passage in the support stem to purge the fuel in both the passage and the injector into the combustor for burning. The disadvantages of this system are that it is large and cumbersome and requires moving parts, e.g. the movable ball check valve, in order to perform the purging function. Moreover, the additional parts not only increase the expense of the system and require separate inventory, but also are subject to malfunction or failure in operation.

Another prior purging system requires the use of two separate and distinct injectors which operate in conjunction and in unison with each other, and in which one of the injectors is constructed in a different manner than the other injector. By such dissimilarity of construction, a pressure differential is created between the two injectors so that one of the injectors functions as a "pusher" injector and the other as a "puller" injector. In this manner the residual fuel on shut down is pushed from the "pusher" injector through a fuel supply line which is common to both of the injectors, and then through the "puller" injector to be discharged for burning in the combustor. Although this system eliminates the need for moving parts in the purging system, it requires the provision of a pair of injectors which operate in conjunction with each other and which have different constructions relative to each other in order to perform the purging function. Due to this dissimilarity of construction, separate individual injectors must be inventoried, and care must be taken to install the proper injector to be used in conjunction with the other dissimilar injector.

In the present invention the aforementioned disadvantages are obviated. In the present invention only a single injector of singular construction need be employed, and the single injector purges itself without the need for movable parts in the purging function, without the need for more than one injector to operate in unison with another injector, and without the need to stock and install injectors of dissimilar construction in order to effect the purging action. Moreover, the volume of residual fuel which must be purged is minimized, and the need to purge fuel manifolds and the like is avoided. Still another advantage of the present invention is that the purging action is essentially instantaneous and automatic upon interruption of the fuel supply to the injector, is thorough and complete and insures virtually complete purging of all the residual fuel, while permitting the continuous circulation of air through the fuel passages during periods of inoperation of the injector and after purging to cool the inoperative injector and its component parts.

In one principal aspect of the present invention, a fuel injector for the combustor of a gas turbine comprises a fuel element having first and second fuel passages each of which has a discharge orifice adjacent an end of the element, and an inlet at a location spaced from the discharge end for receiving fuel from a fuel supply source. An air passage in the element communicates with the first fuel passage to communicate high pressure air to that passage to purge the residual fuel from the fuel passages through the discharge orifice of the second fuel passage when the supply of fuel to the fuel passages is interrupted.

In another principal aspect of the present invention, a fuel injector system for the combustor of a gas turbine comprises at least one fuel element, and the fuel element includes first and second fuel passages each of which has a discharge orifice to discharge fuel from each passage into the combustor adjacent an end of the element. A fuel control initiates and interrupts fuel to the fuel element and first and second fuel conducting passages communicate fuel from the fuel control to the respective first and second fuel passages of the fuel element. A source of air under pressure communicates with the fuel element and its first fuel passage, and the air purges the first and second fuel passages and the first and second fuel conducting passages of residual fuel, and discharges the purged fuel into the combustor from the discharge orifice of the second fuel passage when the supply of fuel to the fuel element is interrupted.

In still another principal aspect of the present invention, the aforementioned fuel element includes an elongate air channel extending longitudinally of the fuel element for discharging air into the combustor from the end of the fuel element from which the fuel is discharged from the fuel passages. The first and second fuel passages also extend longitudinally of the fuel element in radially spaced relationship to the air channel, and an air passage extends between the air channel and the first fuel passage.

In still another principal aspect of the present invention, the aforementioned air passage extends radially between the air channel and the first fuel passage.

In still another principal aspect of the system of the present invention, the first and second fuel conducting passages communicate with each other, and the residual fuel is purged through the first fuel passage, the first and second fuel conducting passages, and the second fuel passage to the combustor in that order.

In still another principal aspect of the system of the present invention, the fuel control includes a check valve which shuts to interrupt the supply of the fuel, and the check valve is positioned upstream of the first and second fuel conducting passages.

In still another principal aspect of the system of the present invention, a second fuel element is included in the system which is continuously supplied with fuel when the gas turbine is in operation, the aforementioned check valve includes a housing having a chamber having an inlet for receiving fuel, and a discharge for discharging fuel from the chamber to the second fuel element, whereby the housing and check valve are cooled by fuel which is communicated to the second fuel element when the gas turbine is in operation.

In still another principal aspect of the present invention, a method of supplying fuel to the combustor of a gas turbine includes supplying the fuel to first and second fuel passages on a fuel injector element and discharging the fuel from the fuel passages into the combustor of the gas turbine, interrupting the fuel to the fuel passages, and supplying air under pressure to the first fuel passage on the fuel injector element when the supply of fuel is interrupted to purge any residual fuel remaining in the fuel passages through the first fuel passage to the second fuel passage, and from the second fuel passage to the combustor to burn the purged fuel.

In still another principal aspect of the method of the present invention, the fuel injector element also includes an air injector, and the air is supplied from the air injector to the first fuel passage to purge the residual fuel through the second fuel passage when the supply of fuel is interrupted to the fuel passages.

In still another principal aspect of the fuel injector, the system and the method of the present invention, a metering portion is positioned adjacent the discharge end of the first fuel passage, and the air under pressure is supplied to the first fuel passage either on the downstream side or the upstream side of the metering portion.

These and other objects, features and advantages of the present invention will be more clearly understood upon consideration of the following detailed description of the preferred embodiments of the invention which will be described to follow.

BRIEF DESCRIPTION OF THE DRAWINGS

In the course of this description reference will frequently be made to the attached drawings in which.

DESCRIPTION OF THE PREFERRED EMBODIMENTS

Figure 1:
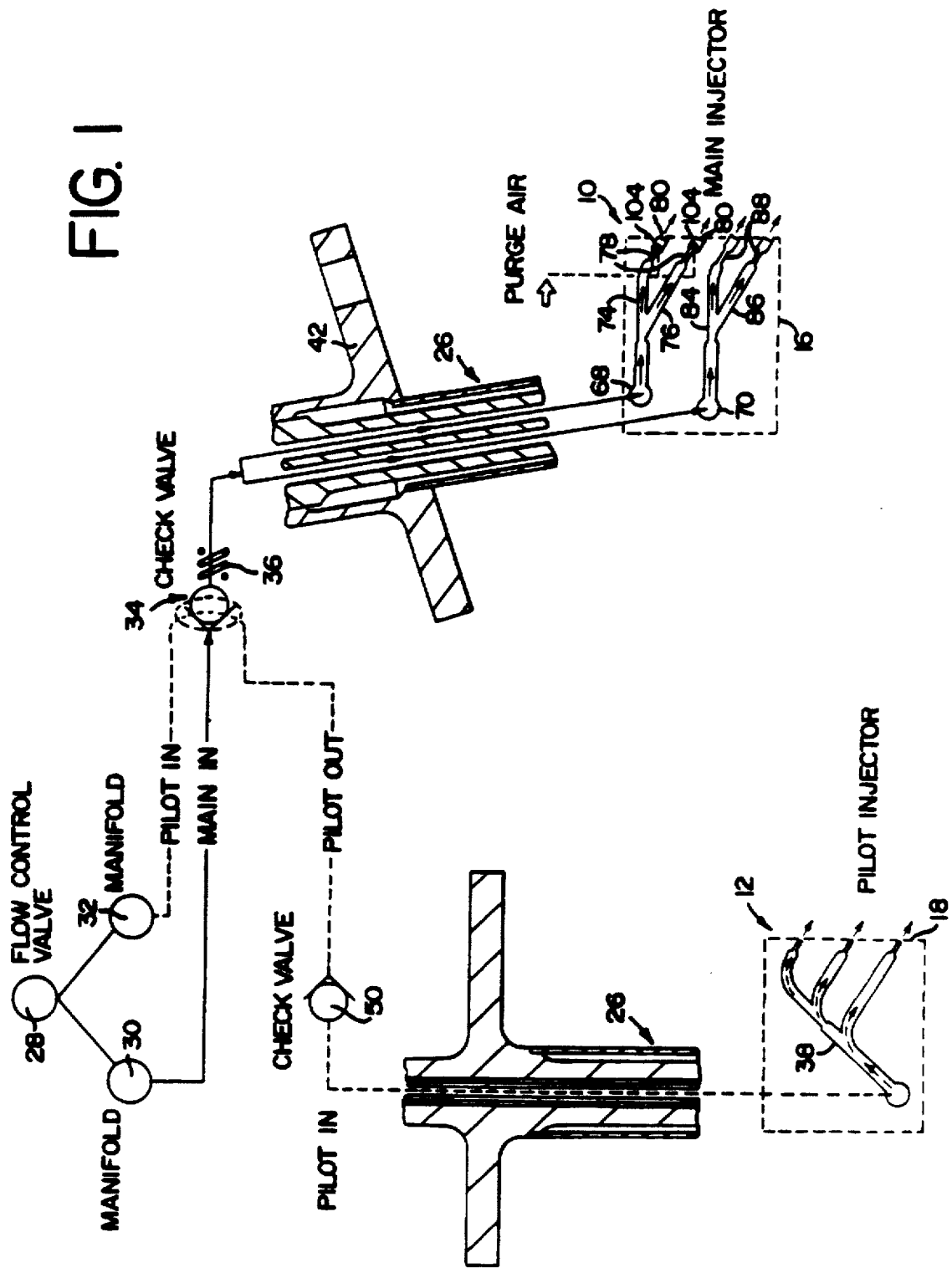
FIG. 1 is an overall schematic view of a system including a fuel supply, a pilot injector and a main injector in accordance with the principles of the invention.

Preferred embodiments of fuel injector and system of the present invention, and for performing the method of the present invention are shown in the drawings.

Figure 4:
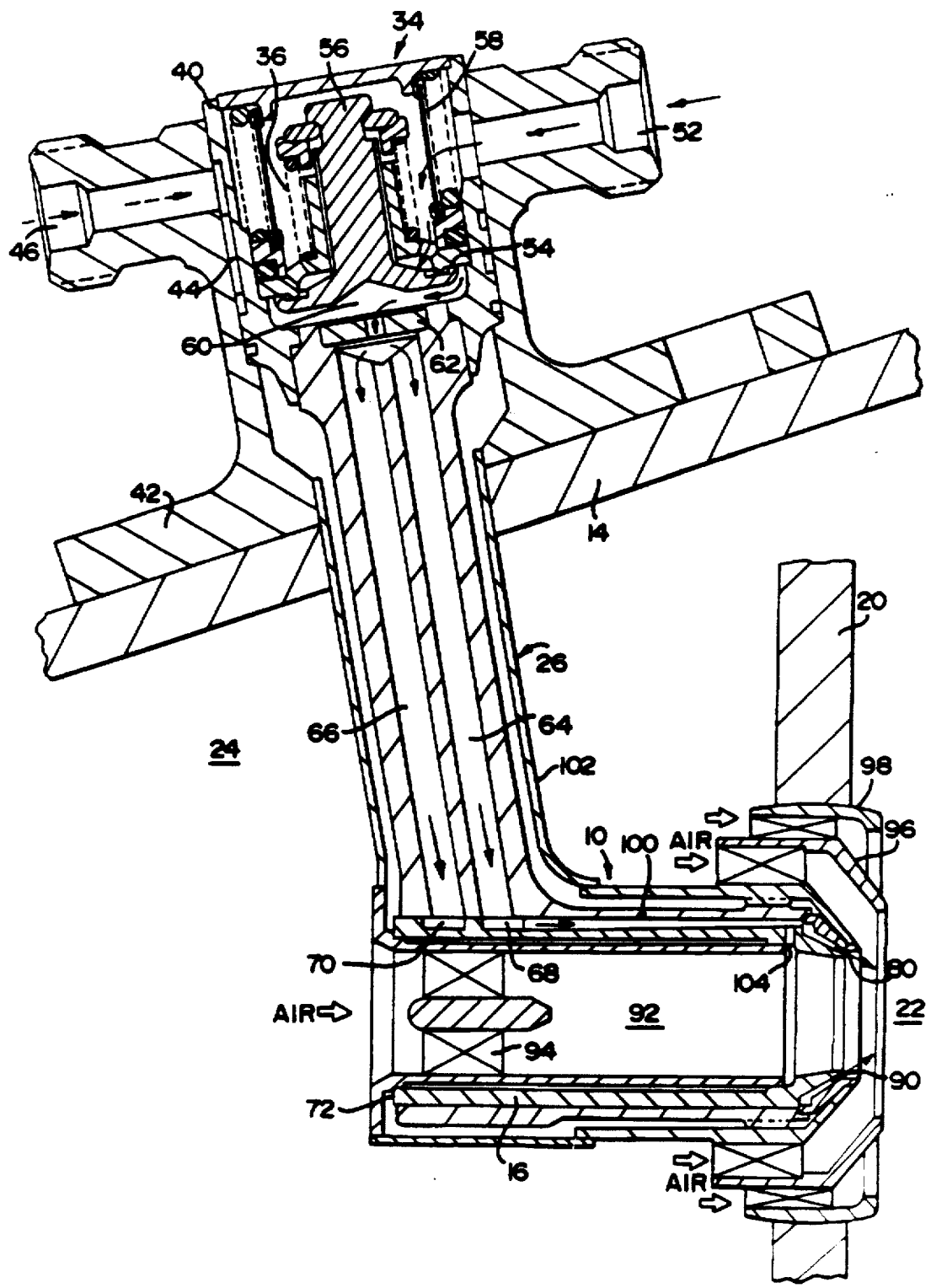
FIG. 4 is a cross-sectioned elevation view of the entire main injector, as viewed substantially along lines 4—4 of FIG. 2, and shown schematically installed on a gas turbine air plenum wall and combustor wall.

The system of the present invention, as schematically shown in FIG. 1, comprises a main or supplemental injector, generally 10, and a pilot injector, generally 12. As previously discussed, the main injector 10 is supplied with fuel during periods of high power requirements, such as during takeoff and ascending to altitude in an aircraft turbine, and once the high power requirements have subsided, the fuel supply to the main injector 10 is shut down. Conversely, the pilot injector 12 is typically in continuous operation at all times that the gas turbine is operational, and is continuously supplied with fuel. The main injector and pilot injector are typically mounted on and suspended from the air plenum outer wall 14 of the turbine, as shown in FIG. 4, and the fuel element 16 of the main injector 10 and fuel element 18 of the pilot injector 12 extend through the combustor wall 20 and discharge into the combustor 22 of the turbine, as shown in FIG. 4. The fuel elements 16 and 18 are supported in the high pressure air plenum 24, as shown in FIG. 4, by a support stem 26 which extends from the air plenum wall 14 into the air plenum 24 and to the fuel elements. Although only a single main injector 10 and pilot injector 12 are shown in FIG. 1, a plurality of each such injectors will be present in a typical gas turbine installation.

Fuel is supplied in a conventional manner from a fuel pump (not shown) under pressure to a flow control valve 28, as shown in FIG. 1. From the flow control valve 28 the fuel flows to two manifolds 30 and 32. Manifold 30 supplies the fuel to the main injector check valve 34 as shown by the solid lines in FIGS. 1–4. When the fuel pressure is low, such as during turbine idling, a check valve spring 36 will operate the check valve 34 to interrupt the fuel supply to the main injector. Fuel is also supplied from the manifold 32, as shown by the dotted lines in the drawing, to continuously flow to and through the housing of the check valve 34 to cool the housing, as will be explained in more detail to follow. This fuel will continuously flow from the housing of the check valve to the pilot injector 12 while the turbine is in operation, both during periods of low power requirements as well as high power requirements, will pass through the support stem 26 of the pilot injector 12, the fuel passages 38 in the fuel element 18 of the pilot injector 12, and will be discharged into the combustor of the gas turbine for combustion.

Figure 2:
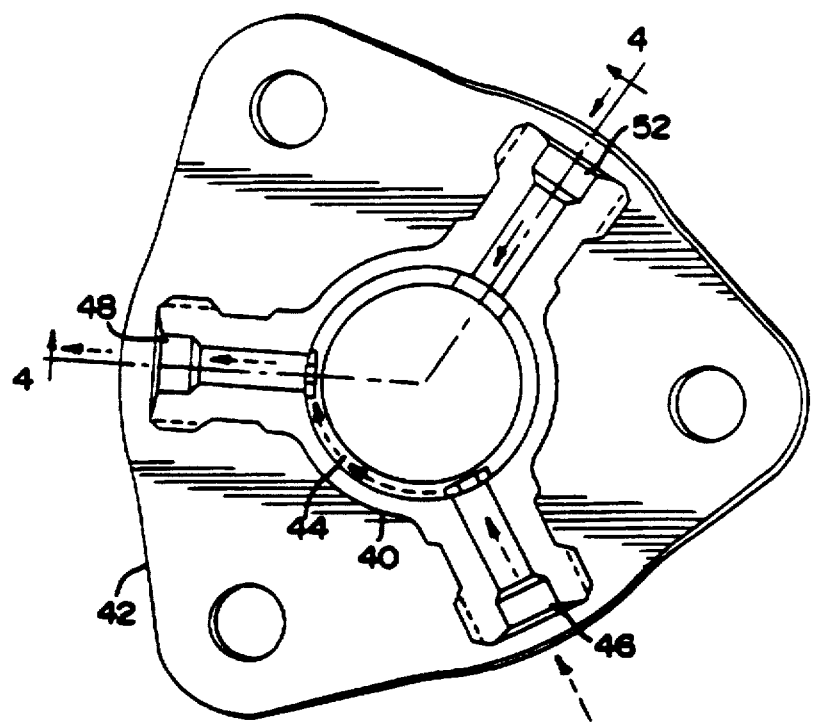
FIG. 2 is a plan view of a preferred embodiment of main injector of the invention.
Figure 3:
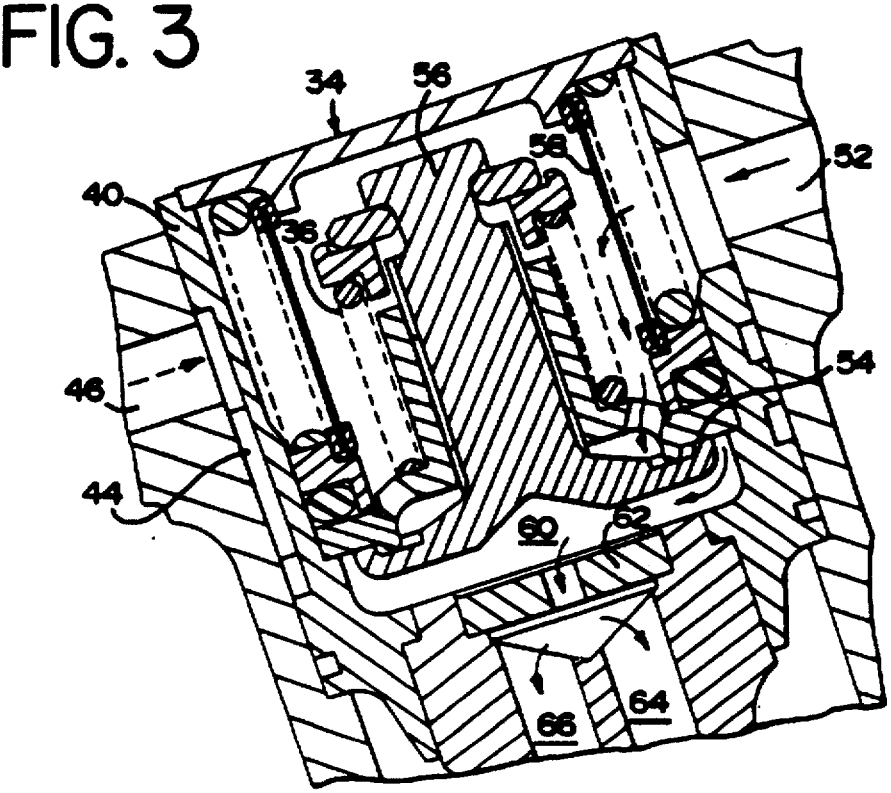
FIG. 3 is a partially broken cross-sectioned elevation view of the check valve and housing of the main injector shown in FIG. 2.

With particular reference to FIGS. 2–4, the main injector check valve 34 includes a housing 40 which preferably is mounted, by a suitable flange 42, outside of the wall 14 of the air plenum 24. The housing 40 includes an annular chamber 44 to which the fuel for the pilot injector 12 is continuously supplied, as shown by the dotted arrows, through inlet 46, and is discharged to the pilot injector from the housing by an outlet 48, the latter of which is best seen in FIG. 2. The fuel discharged from the housing 40 then passes through a pilot injector check valve 50, as shown in FIG. 1, and to the pilot injector fuel element 18 and fuel passages 38 for discharge into the combustor during turbine operation. Thus, it will be seen that the pilot injector fuel which flows continuously through the annular chamber 44 while the turbine is in operation will cool the check valve 34 and its housing 40.

When the pressure of the fuel at the flow control valve 28 exceeds a predetermined level during periods of high power levels, this pressure will exceed the load of spring 36, and the check valve 34 will open to supply fuel to the main injector 10. With reference particularly to FIGS. 2–4, the main injector fuel, as shown by the solid arrows, is communicated to the check valve 34 through inlet 52. When the fuel pressure exceeds a certain predetermined level during high power demand, the fuel will exert a sufficient pressure on the seat 54 of the valve 56 to cause the valve seat to move downwardly, as viewed in FIGS. 3 and 4, against the force of spring 36. When this occurs, fuel will flow to the main injector through the inlet 52 and filter screen 58, and will pass the valve seat 54, as shown by the solid arrows, to a chamber 60 beneath the valve 56.

A trim orifice 62 is positioned at the top end of the support stem 26, as shown FIGS. 3 and 4, to meter the fuel to the support stem and its fuel element. The fuel passes through the trim orifice 62, as best seen in FIGS. 3 and 4, and is equally distributed to a pair of fuel conducting passages 64 and 66 which extend the length of the support stem, to conduct the fuel to the fuel element 16, again as shown by the solid arrows in the drawings.

Figure 6:
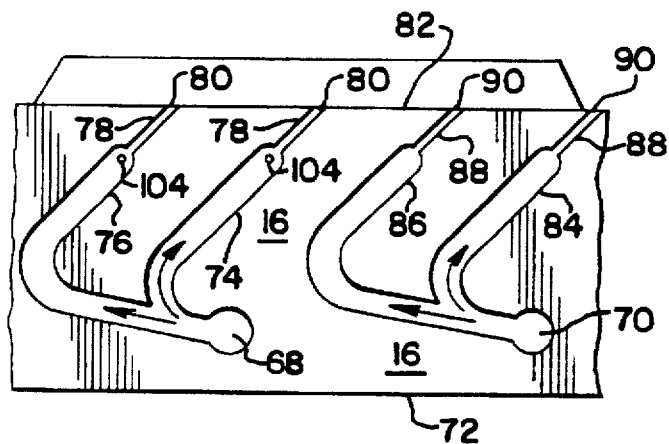
FIG. 6 is an elevation view of the fuel element as shown in FIG. 5, but in which the cylindrical surface of the fuel element has been flattened and spread into a plane to more clearly illustrate the arrangement of the fuel passages on the element.

With reference particularly to FIGS. 4–7, the fuel element 16 preferably comprises a cylindrical body which has at least a pair of discrete inlet chambers 68 and 70 milled or otherwise formed in its outer surface adjacent one end 72 of the fuel element. The inlet chambers 68 and 70 are shown in longitudinal alignment with each other in FIG. 4 for illustrative purposes only. The inlet chambers in practice preferably will be spaced from each other about the circumference of the fuel element 16, as best seen in FIG. 6. One of the fuel conducting passages 64 communicates the fuel from the trim orifice 62 to the inlet chamber 68, and the other fuel conducting passage 66 communicates the fuel to the other inlet chamber 70.

Figure 5:
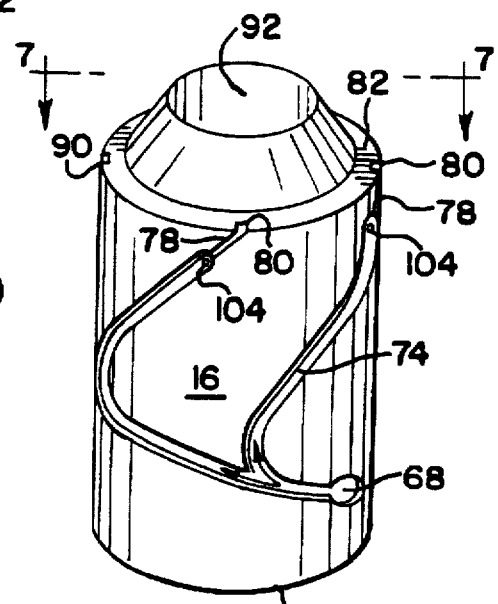
FIG. 5 is a perspective view of a preferred embodiment of main injector fuel element incorporating the principles of the invention.
Figure 7:
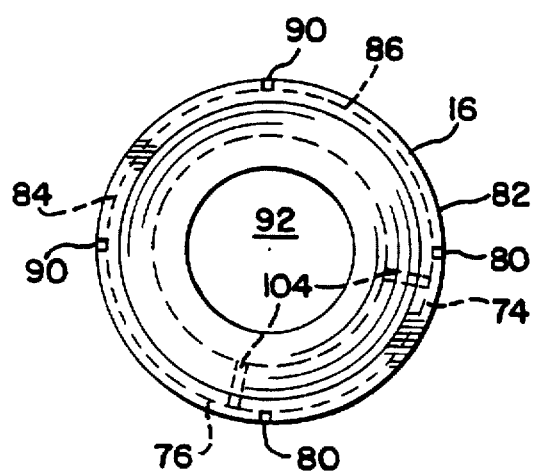
FIG. 7 is a plan view of the fuel element, as viewed substantially along line 7—7 of FIG. 5.

Again as shown by the solid arrows in FIGS. 5 and 6, the fuel will flow from the inlet chamber 68 to a first pair of fuel passages 74 and 76 which are also preferably milled or otherwise formed in the surface of the fuel element 16. The fuel passages 74 and 76 also preferably include a milled metering portion 78 at each of their ends adjacent the discharge orifices 80 from which the fuel is discharged into the combustor 22, as shown in FIG. 4. The metering portions 78 preferably approach the discharge end 82 of the fuel element in a tangential manner to impart a swirling motion to the fuel as it is discharged to enhance combustion of the fuel.

The fuel also passes from the inlet chamber 70 to a second pair of fuel passages 84 and 86, as best seen in FIG. 6, which also include tangentially arranged metering portions 88 adjacent the discharge orifices 90 of the fuel passages 84 and 86 from which atomized fuel is discharged in a swirling fashion into the combustor 22.

Although two first fuel passages 74 and 76 and two second fuel passages 84 and 86 are shown and described, it will be understood that only single first and second fuel passages may be employed, as well as more than two of each of such passages without departing from the principles of the invention.

High pressure air which has been compressed by the compressor (not shown) of the gas turbine, and which is present in the air plenum 24, as seen in FIG. 4, is also supplied via the injector of the invention to the combustor 22. As shown in FIG. 4 by the hollow arrows, this air flows through a longitudinal, axially extending air channel 92 which extends the length of the fuel element 16, and the air is discharged into the combustor 22 adjacent the fuel discharge orifices 80 and 90 where it intimately mixes with the swirling fuel in the combustor for combustion. The air channel 92 is positioned radially inwardly of the fuel passages 74, 76 and 84, 86 on the outer surface of the fuel element as shown in the drawings. An air swirler 94 is also preferably positioned in the air channel 92 to impart a swirling motion to the air. In addition, the injector 10 may be surrounded by one or more air dome caps 96 and 98, as shown in FIG. 4, to introduce additional swirling air to the combustor 22 together with the swirling fuel.

When the fuel element 16 is positioned on the support stem 26, a longitudinally extending sleeve 100 supports the fuel element 16. The sleeve 100 is preferably shrunk fit around the fuel element 16 so as to confine the fuel passages 74, 76, 84, 86 which are formed on the outer surface of the fuel element 16. The entire assembly is also preferably surrounded with one or more heat shields 102, as shown in FIG. 4, to protect the assembly against heat.

As previously described, when the power demand of the gas turbine shifts from high to low power, the pressure of the fuel from the flow control valve 28, as shown in FIG. 1, will be reduced. However, this low pressure fuel in manifold 32 will continue to flow, as shown by the dotted lines, to the housing 40 of the check valve 34, through the annular chamber 44 in the check valve to cool the check valve, and from there to the pilot injector 12 where it will be discharged into the combustor 22 for burning. However, the low pressure of the fuel in manifold 30 now will be insufficient to overcome the force of spring 36 of the main injector check valve 34, and the check valve 34 will move to the closed position, as shown in FIGS. 3 and 4, to interrupt the flow of fuel beyond the check valve and to the main injector 10.

When the supply of fuel has been interrupted to the main injector, residual fuel will remain in the chamber 60, the fuel conducting passages 64 and 66, and the first fuel passages 74 and 76 and second fuel passages 84 and 86 of the fuel element 16. It is important that this residual fuel be purged to prevent coking of the residual fuel due to the continuing presence of the high temperatures in the combustor 22 and the close proximity of the injector assembly to that high temperature. It is a principal purpose of the present invention to effect this purge upon fuel interruption in a simple, inexpensive and reliable manner.

To carry out this purging function in the present invention, a pair of very small air passages 104 are bored or drilled so that each extends radially between the air channel 92 and the respective first fuel passages 74 and 76 adjacent the discharge of the fuel from those first passages. As best shown in FIGS. 5 and 6, the air passages 104 are positioned upstream of the metering portions 78 of the fuel passages. Alternatively as shown in FIG. 1, the metering portions 78 of the first fuel passages 74 and 76 may be spaced slightly upstream of the fuel discharge orifices 80, and the air passages 104 are positioned downstream of the metering portions 78 between the metering portions and the discharge orifices 80 of the first fuel passages 74 and 76. Importantly it will be noted that the second fuel passages 84 and 86 do not include such purging air passages.

From the foregoing description it will be appreciated that when fuel flow to the main injector fuel element 16 is interrupted, a pressure differential will be created between the first fuel passages 74 and 76 and the second fuel passages 84 and 86 by the high pressure air which will enter the first fuel passages through the air passages 104 from the air channel 92. This higher pressure air will force the residual fuel in a reverse direction through the first air passages 74 and 76, the inlet chamber 68, the fuel conducting passage 64, the fuel conducting passage 66 which communicates with the fuel conducting passage 64 adjacent the trim orifice 62, the inlet chamber 70 and the second fuel passages 84 and 86, and this residual fuel will be discharged from the discharge orifices 90 of the second fuel passages into the combustor 22 for burning. Once the residual fuel has been purged in the manner described, the purging air will continue to flow through the assembly during main injector shut down and while the turbine continues to be operational to maintain the injector clear of fuel.

From the foregoing it will be seen that the purging action of the present invention overcomes a number of disadvantages of the prior art purging systems. It is simple and eloquent in its construction, design and function, avoids the need for moving parts and for the combination and operation in unison of more than one injector, and avoids the need for at least a pair of injectors of differing construction.

It will be understood that although the purging arrangement of the present invention has been described particularly for use with gas turbine main injectors which function only intermittently during gas turbine operation, the principles of the present invention may be readily adapted, if desired, to pilot injectors, or to other fluid injectors.

It will also be understood that the preferred embodiments of the present invention which have been described are merely illustrative of the principles of the present invention. Numerous modifications may be made by those skilled in the art without departing from the true spirit and scope of the invention.

We claim:

1. Fluid spray apparatus comprising:
   an element having first and second fluid passages for conveying a first fluid therethrough, said first and second fluid passages each having a discharge office adjacent an end of the element for discharging a spray of said first fluid, and inlet at a location spaced from said end for receiving the first fluid from a first fluid supply source;
   a passage for a second fluid in said element communicating with said first first fluid passage to communicate a high pressure second fluid to said first first fluid passage to purge the residual first fluid from said first and second first fluid passages through the discharge orifice of said second first fluid passage when the supply of first fluid to said first and second first fluid passages is interrupted;
   said element having a longitudinal axis; and
   said discharge orifices of said first and second first fluid passages are spaced from said longitudinal axis by substantially the same distance for each.

2. The fluid spray apparatus of claim 1, wherein said element includes an elongate channel for second fluid extending longitudinally of said element for discharging said second fluid from the end of the element from which the first fluid is discharged from said first and second first fluid passages, said first and second first fluid passages also extending longitudinally of said element and in radially spaced relationship to said channel for said second fluid, and said passage for said second fluid extends between said channel for said second fluid and said first first fluid passage.

3. The fluid spray apparatus of claim 2, wherein said passage for said second fluid extends radially between said channel for said second fluid and said first first fluid passage.

4. The fluid spray apparatus of claim 1, including a metering portion adjacent the discharge end of said first first fluid passage, and said passage for second fluid communicates with said first first fluid passage on the downstream side of said metering portion.

5. The fluid spray apparatus of claim 1, including a metering portion adjacent the discharge end of said first first fluid passage, and said passage for second fluid communicates with said first first fluid passage on the upstream side of said metering portion.

6. The fluid spray apparatus of claim 1, wherein said first and second first fluid passages each comprise a pair of passages, a pair of said passages for second fluid, and each of said passages for second fluid communicates with a respective one of the pair of first first fluid passages.

7. The fluid spray apparatus of claim 1, wherein said passage for second fluid communicates with said first first fluid passage upstream of said discharge orifice of said first first fluid passage.

8. The fluid spray apparatus of claim 1, wherein at least said first first fluid passage includes a portion of reduced cross-section, and said passage for second fluid communicates with said first first fluid passage adjacent said reduced cross-section.

9. The fluid spray apparatus of claim 2, wherein said passage for second fluid communicates at a substantial angle with said first first fluid passage.

10. The fluid spray apparatus of claim 2, wherein the radially spaced relationship of said first fluid passages to said channel for said second fluid is substantially the same for both said first and second first fluid passages.

11. The fluid spray apparatus of claim 1, wherein the first fluid is a liquid and the second fluid is a gas.

12. A fluid spray system comprising:
   at least one element, said element having first and second fluid passages for conveying a first fluid therethrough and each of which has a discharge orifice to discharge a spray of the first fluid from each said passage adjacent an end of the element;
   control means for initiating and interrupting the flow of the first fluid to said element;
   first and second conducting passages for communicating the first fluid from said control means to the respective first and second first fluid passages of said element;
   a source of a second fluid under pressure communicating with said element and its first fluid passage to purge said first and second first fluid passages and said first and second first fluid conducting passages of residual first fluid and discharging said purged residual first fluid from the discharge orifice of said second first fluid passage when the supply of first fluid to said element is interrupted;

said element having a longitudinal axis; and said discharge orifices of said first and second first fluid passages are spaced from said longitudinal axis by substantially the same distance for each.

13. The system of claim 12, wherein said element includes a channel extending therethrough for discharging the second fluid from said element, and a passage for the second fluid in said element communicating the second fluid from said channel to said first first fluid passage when the supply of first fluid to said first and second first fluid passages is interrupted to purge said residual first fluid.

14. The system of claim 13, wherein said passage for second fluid extends radially between said channel and said first first fluid passage.

15. The system of claim 12, including a metering portion adjacent the discharge end of said first first fluid passage, and said passage for second fluid communicates with said first first fluid passage on the downstream side of said metering portion.

16. The system of claim 12, including a metering portion adjacent the discharge end of said first first fluid passage, and said passage for second fluid communicates with said first first fluid passage on the upstream side of said metering portion.

17. The system of claim 12, wherein said first and second first fluid passages each comprise a pair of passages, a pair of said passages for second fluid, and each of said passages for second fluid communicates with each of the pair of first first fluid passages.

18. The system of claim 12, wherein said first and second first fluid passages communicate with each other and the residual first fluid is purged through said first first fluid passage, and first and second first fluid conducting passages and said second first fluid passage in that order.

19. The system of claim 13, wherein said first and second first fluid conducting passages communicate with each other and the residual first fluid is purged through said first first fluid passage, said first and second first fluid conducting passages and said second first fluid passage in that order.

20. The system of claim 12, wherein said control means includes a check valve which shuts to interrupt the supply of the first fluid, and which is positioned upstream of said first and second first fluid conducting passages.

21. The system of claim 20, wherein substantially all of the residual first fluid downstream of said check valve is purged when the supply of first fluid is interrupted.

22. The system of claim 20, including a second element which is continuously supplied with the first fluid when the system is in operation, a housing on said check valve including a chamber, an inlet to said chamber for receiving the first fluid, and a discharge for discharging the first fluid from said chamber to said second element, whereby said housing and check valve are cooled by the first fluid which is communicated to the second element when the system is in operation.

23. The system of claim 13, wherein said passage for second fluid communicates with said first first fluid passage upstream of said discharge orifice of said first first fluid passage.

24. The system of claim 13, wherein at least said first first fluid passage includes a portion of reduced cross-section, and said passage for second fluid communicates with said first first fluid passage adjacent said reduced cross-section.

25. The system of claim 13, wherein said passage for second fluid communicates at a substantial angle with said first first fluid passage.

26. The system of claim 13, wherein both of said first fluid passages are spaced from said channel by substantially the same distance.

27. The system of claim 12, wherein the first fluid is a liquid and the second fluid is a gas.

28. A method of supplying a fluid to spray equipment comprising:

supplying a first fluid to first and second passages in an element for conveying the first fluid through the passages, and discharging the first fluid from the first and second first fluid passages as a spray;

interrupting the first fluid to said first and second first fluid passages;

supplying a second fluid under pressure to said first first fluid passage on the element when the supply of first fluid is interrupted to purge any residual first fluid remaining in said first fluid passages through said first first fluid passage to said second first fluid passage, and from said second first fluid passage;

said element having a longitudinal axis; and the first fluid is discharged from discharge orifices of said first and second first fluid passages which orifices are spaced from said longitudinal axis by substantially the same distance for each.

29. The method claim 28, wherein the second fluid is also supplied to a second fluid channel in the said element, and the second fluid is supplied from the channel to the first first fluid passage to purge the residual first fluid therein through the second first fluid passage when the supply of first fluid is interrupted to said first and second first fluid passages.

30. The method of claim 29, wherein the second fluid is supplied from the channel to the first first fluid passage by a passage for second fluid in the element which extends between the channel and said first first fluid passage.

31. The method of claim 28, including a metering portion adjacent the discharge end of said first first fluid passage, and said second fluid under pressure is supplied to said first first fluid passage on the downstream side of said metering portion.

32. The method of claim 28, including a metering portion adjacent the discharge end of said first first fluid passage, and said second fluid under pressure is supplied to said first first fluid passage on the upstream side of said metering portion.

33. The method of claim 32, wherein said second fluid passage communicates with said first first fluid passage upstream of the location at which first fluid is discharged from said first first fluid passage.

34. The method of claim 32, wherein at least said first first fluid passage includes a portion of reduced cross-section, and said passage for second fluid communicates with said first first fluid passage adjacent said reduced cross-section.

35. The method of claim 32, wherein said passage for second fluid communicates at a substantial angle with said first first fluid passage.

36. The method of claim 32, wherein both of said first fluid passages are spaced from said channel by substantially the same distance.

37. The method of claim 28, wherein the first fluid is a liquid and the second fluid is a gas.

* * * * *